Figure 2:
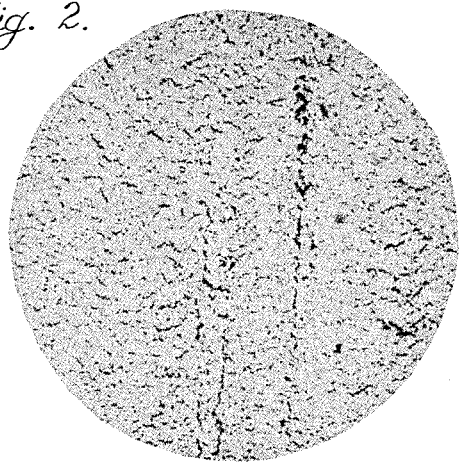

INVENTOR.
James Woodburn, Jr.
BY Walter L. Schlegel, Jr.
Atty.

United States Patent Office 3,089,195
Patented May 14, 1963

3,089,195
PROCESS FOR PRODUCING A SHAPED GRAPHITE ARTICLE
James Woodburn, Jr., Wheaton, Ill., assignor to Amsted Industries Incorporated, Chicago, Ill., a corporation of New Jersey
Filed Dec. 18, 1957, Ser. No. 703,657
1 Claim. (Cl. 18—47.5)

This invention relates to the production of made-to-shape graphite articles, such as, for example thermocouple tips, crucibles, and molds for high production castings.

According to prior art practices, graphite articles have generally been produced by mixing carbon particles, such as petroleum coke flour with pitch and then firing to about 1500° F. to reduce the pitch to carbon. The article is then slowly heated to about 5000° F. and held at graphitizing temperature until the entire article is graphitized.

A primary disadvantage of such prior art techniques has been the necessity for supporting the article in shape as it is heated through the plastic range of the pitch.

According to the invention, it has been discovered that a made-to-shape carbon article can be produced by mixing carbon powder (known in the art as flour) at room temperature with a thermo-setting hydro-carbon resin or binder such as furfuryl resin and a suitable acid catalyst preferably an organic acid such as maleic or phthalic anhydride. The mixture may be extruded to shape or may be pressed at room temperature into a die of steel or other suitable material to form an article shaped to the configuration of the die. The shaped article is then preferably removed from the die and cured, as by heating in an oven, to set the binder. Thereafter, the article is "fired" to carbonize the resin and thereby form an all carbon article, by heating the article in a substantially oxygen-free atmosphere at a suitable temperature and at a suitable rate of temperature increase to carbonize the resin without cracking the article.

By means of this novel process, the time during which the mixture must be retained in the die is minimized, and the cured articles may be conveniently stored, for a sufficient length of time to economically fire the articles in batches. Also, complicated and difficult to machine surfaces may be formed on the articles with accuracy and economy heretofore unknown in the art, as for example in the production of graphite molds and crucibles, as well as other graphite articles.

Another feature of the invention is to fire an article produced as above described without loss of contour and without support of shape, as distinguished from prior art firing of pitch bonded mixtures which must be heated through a plastic stage before carbonization occurs.

Another advantage of the invention is that a carbon article, formed as above described with a thermo-setting resin, produces a more uniform structure with respect to porosity because the binder does not liquify and "migrate" during firing and because volatile pressure does not distort the piece as in the case of pitch bonded articles.

Figure 1:
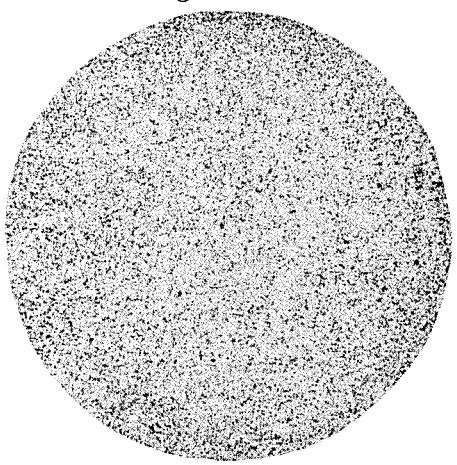
Figure 4:
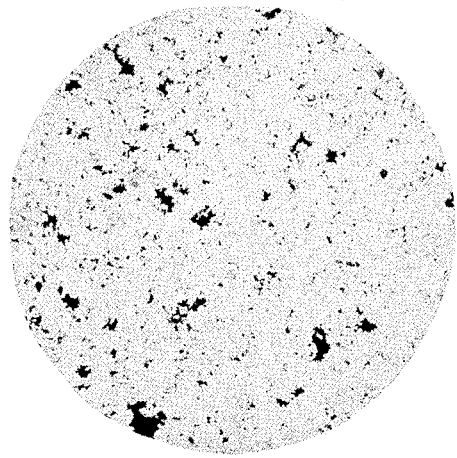
Figure 3:
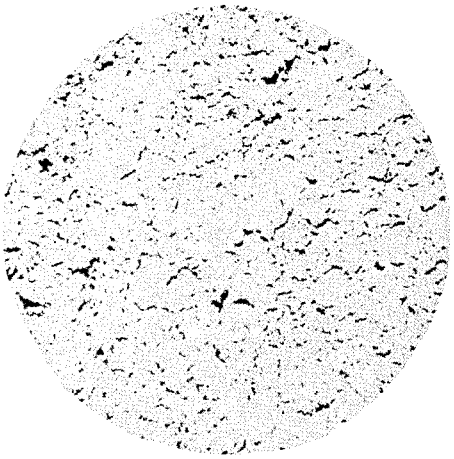

The foregoing and other objects and advantages of the invention will become apparent from a consideration of the following specification and the accompanying drawings, wherein:

FIGURE 1 is a microphotographic illustration at a magnification of 5.5 showing graphitic structure produced according to the novel process; and FIGURES 2–4 are similar microphotographic illustrations at the same magnification showing graphitic structure produced according to prior art practices.

In general, the novel process comprises the following basic steps:

(1) Mixing of a carbon aggregate such as petroleum coke powder with a hydro-carbon binder which is thermo-setting.
(2) Shaping the mixture at room temperature by molding or extrusion.
(3) Curing the mixture to set the binder.
(4) Firing the mixture at a sufficient temperature to reduce the binder to a carbon residue which bonds the aggregate.
(5) Impregnation of the porous fired piece with a hydro-carbon such as pitch where high strength is desired.
(6) Graphitizing.

The following Table No. 1 gives several examples of mixtures and curing procedures utilized in the practice of the invention:

| Article No. | Materials in Mix | Parts by Weight | Article Produced | Molding pressure (p.s.i.) | Curing Temp., °F. | Curing Time, hr. |
|---|---|---|---|---|---|---|
| 1 | C<br>V<br>M | 100<br>30<br>1.1 | Gear mold | 1,000 | 160 | 20 |
| 2 | C<br>V<br>M | 100<br>28<br>1.0 | crucible, 4″ diameter, 5″ long | 2,000 | 160 | 18 |
| 3 | C<br>V<br>M | 100<br>29<br>.87 | crucible, 8″ diameter, 10″ long | 1,000 (bottom)<br>2,000 (top) | 175<br>230 | 16<br>1 |
| 4 | C<br>V<br>M | 100<br>28<br>.5 | valve mold | 2,000 | 170 | 18 |
| 5 | C<br>T<br>V<br>M | 90<br>10<br>20<br>.4 | ----do---- | 2,000 | 170 | 16 |
| 6 | C<br>T<br>V<br>M | 90<br>10<br>20<br>.4 | Rocket Nozzle, 4″ diameter | 2,000 | 170 | 18 |

Key: C—Petroleum coke—52% passes 200 Tyler Standard mesh—100% passes 100 mesh; T—soot (such as is commercially sold under trademark "Thermax"); V—Furfuryl resin; M—Maleic anhydride.

It has been discovered that the modulus of rupture of a graphite article, produced from a mixture such as above described, is inadequate for most purposes if the binder content is less than 16 parts by weight; and excessive squeeze-out of the binder occurs if the binder content exceeds 24 parts by weight. This range of binder applies to articles 5 and 6 only where the mix consists of 10 parts of Thermax and 90 parts of coke. Mixes which contain 100 parts of coke and no Thermax use more binder and can be used in the range of 34 maximum and 24 minimum.

It has also been discovered that the molding pressure must be released and the article, if shaped in a die, should preferably be removed therefrom before curing the article to set the binder. Otherwise, there is a pronounced tendency for the article to crack or disintegrate during firing of the article to carbonize the binder.

In producing graphite articles according to the novel process it was found that an article cured in the mold within reasonable time limitations is difficult to fire without cracking or breaking. The curing time can be controlled by varying the acidity of the mix and the curing temperature. To speed up the curing cycle, the acidity of the mix was increased and the curing temperature was increased to about 350° F.; however when the article was contained in the mold during accelerated curing, water vapor given off by the polymerization developed high pressures which stopped further polymerization. As a result, the article so formed literally exploded upon removal from the mold.

To eliminate the water vapor prior to molding, the mix was advanced for several hours at about 170° F., then molded and cured in the mold. The process, under these conditions, was very difficult to control; and the articles so formed, as hereinafter discussed were difficult to fire without cracking.

The articles listed in Table 1 were molded and then removed from the mold. The articles were then cured as indicated in the table and were subsequently fired to carbonize the binder.

In firing the articles, they were heated in a furnace to 1650° F. in an oxygen-free state. The pieces which had been cured in the mold were difficult to fire, and temperature increases of as low as 20° F. per hour in the range of 300°–1000° F. caused cracking. Articles of the same size which had been cured after removal from the mold were successfully fired at rates of 100° F. per hour in the range of 300°–1000° F. The maximum firing rate for articles of this size formed by the prior art practice of extruding pitch bonded mixtures is about 10° F. per hour.

After the articles had been fired, they were removed from the furnace and several of the articles were impregnated with a solution consisting of equal parts of furfuryl alcohol and furfuraldehyde catalyzed with two percent maleic anhydride. One of the articles was soaked in this solution for fifty-four hours, then cured at 170° F. for 18 hours, and then refired as above described. The weight gain of this article was 5.9% indicating that somewhat less than half the pores were filled. A second article was subjected to a vacuum to remove air from the pores and was then covered with the solution using atmospheric pressure to force the solution into the pores. Weight gain of this second article after curing was 14.3%. The second article was then refired at a rate of 100° F. per hour and upon test proved to be sound.

The final step in the novel process consists of graphitizing the articles, whether impregnated or not. This could be done by conventional graphitizing techniques in which the articles are packed in granular coke covered with a silicon carbide layer at least eighteen inches thick. According to prior art practices the articles are then resistance heated in a furnace to a range of about 4600°–5000° F.

According to the invention, the fired articles were placed in covered cylindrical graphite containers within an induction coil. In some instances, where the articles were large, single articles were placed directly within the coil. In packing the furnace, the container or single carbon article, as the case may be, was placed on three carbon piers which rested directly on the furnace bottom. Carbon insulation in the form of commercial soot known by the trade name "Thermax" was packed loosely under, around, and over the load. The coil was then energized and balanced to unity power factor as per standard procedure in the use of such coils. The articles were graphitized without difficulty and the cycle was much shorter than for comparable size articles graphitized in a conventional resistance furnace where the heat is generated in the granular carbon between the pieces to be graphitized.

Graphite articles produced in accordance with the invention are equal in mechanical strength and have a higher electrical resistivity than prior art graphite articles. Furthermore, the graphitic structure poduced in accordance with the novel process is superior to that produced by prior art methods.

FIGURES 1–4 are microphotographs showing the grain structure of graphite produced according to the invention and according to prior art practices. FIGURE 1 is a magnification of 5.5 showing the grain structure of the article identified as No. 5 in Table No. 1. It will be seen that the pores are much smaller and more evenly distributed than the commercial grades of graphite illustrated at a magnification of 5.5 in FIGURES 2–4.

I claim:

In a method of producing a made-to-shape graphite article, the steps of mixing carbon powder with a thermosetting furfuryl resin binder, then shaping the mixture to form an article, then curing the article, unsupported as to its shape, to set the binder, then firing the article, unsupported as to its shape, to carbonize the binder, and then graphitizing the article.

References Cited in the file of this patent

UNITED STATES PATENTS

| | | |
|---|---|---|
| 1,556,990 | Henry | Oct. 13, 1925 |
| 1,804,052 | Haas | May 5, 1931 |
| 2,224,724 | Elsey | Dec. 10, 1940 |
| 2,401,760 | Heyroth | June 11, 1946 |
| 2,761,848 | Bushong et al. | Sept. 4, 1956 |